(12) United States Patent
Sennik

(10) Patent No.: US 11,725,399 B1
(45) Date of Patent: Aug. 15, 2023

(54) FLOORING UNDERLAYMENT

(71) Applicant: DMX Membranes Limited, Brampton (CA)

(72) Inventor: Sundeepan Sennik, Thornhill (CA)

(73) Assignee: DMX MEMBRANES LIMITED, Brampton (CA)

( * ) Notice: Subject to any disclaimer, the term of this patent is extended or adjusted under 35 U.S.C. 154(b) by 0 days.

(21) Appl. No.: 17/967,341

(22) Filed: Oct. 17, 2022

(51) Int. Cl.
*E04F 15/18* (2006.01)
*F24D 3/14* (2006.01)

(52) U.S. Cl.
CPC .......... *E04F 15/182* (2013.01); *E04F 15/185* (2013.01); *F24D 3/142* (2013.01); *F24D 3/146* (2013.01)

(58) Field of Classification Search
CPC ....... E04F 15/18; E04F 15/182; E04F 15/185; E04F 15/186; E04F 2290/023; F24D 3/14; F24D 3/142; F24D 3/146; F24D 13/02; E04C 2/32
See application file for complete search history.

(56) References Cited

U.S. PATENT DOCUMENTS

| | | | |
|---|---|---|---|
| 6,434,901 B1 | 8/2002 | Schluter | |
| 8,695,300 B2* | 4/2014 | Hartl | E04F 15/186 52/302.1 |
| 9,328,520 B1 | 5/2016 | Kriser | |
| 9,719,265 B2 | 9/2017 | Bordin et al. | |
| 10,215,423 B2* | 2/2019 | Bordin | F24D 13/02 |
| 10,626,623 B2* | 4/2020 | Cais | B32B 7/12 |
| 10,900,241 B2* | 1/2021 | Schluter | G02B 7/003 |
| 10,928,075 B1* | 2/2021 | Warneke | F24D 3/142 |
| 2013/0011609 A1* | 1/2013 | Comitale | B32B 7/12 428/141 |
| 2018/0127989 A1* | 5/2018 | Schluter | E04F 15/182 |
| 2020/0392743 A1* | 12/2020 | Bennett | E04B 5/48 |
| 2022/0146118 A1 | 5/2022 | Schluter | |
| 2022/0372767 A1* | 11/2022 | Kaiser | E04F 15/182 |
| 2023/0072576 A1* | 3/2023 | Warneke | E04F 15/182 |

FOREIGN PATENT DOCUMENTS

| | | | | |
|---|---|---|---|---|
| DE | 202005004127 U1 * | 6/2006 | | E04F 13/00 |
| DE | 202017101349 U1 * | 7/2018 | | E04C 2/20 |
| EP | 2148022 A2 * | 1/2010 | | E04D 13/0477 |
| WO | WO-2011102617 A2 * | 8/2011 | | E04F 15/18 |
| WO | WO-2020252219 A1 * | 12/2020 | | E04B 1/80 |

* cited by examiner

*Primary Examiner* — Ryan D Kwiecinski
(74) *Attorney, Agent, or Firm* — Bereskin & Parr LLP/S.E.N.C.R.L., s.r.l.

(57) ABSTRACT

A flooring underlayment comprises a membrane that includes a body panel having a panel top surface and a panel underside surface spaced apart from the panel top surface by a panel thickness. The membrane further includes a plurality of dimples projecting downward from the panel underside surface, each dimple having a dimple upper end open to the panel top surface, a closed dimple lower end spaced apart from the dimple upper end by a dimple height, and a dimple sidewall extending between the dimple upper end and the dimple lower end, the dimple sidewall configured to inhibit collapse of the dimple height when a load is applied to the flooring underlayment during use. The membrane includes a plurality of grooves open to the panel top surface and formed within a groove body projecting downward from the panel underside surface, each groove shaped to receive an elongated heating element therein.

16 Claims, 5 Drawing Sheets

FLOORING UNDERLAYMENT

FIELD

The specification relates generally to flooring, and, more specifically, to flooring underlayment for heated floors.

BACKGROUND

U.S. Pat. No. 6,434,901 (Schluter) purports to disclose a support and/or drainage plate made of a foil-like plastic material, for use with a plate-lined floor structure or a wall so as to create a space between the ground and the surface lining to be applied onto the foil-like plate. Schlüter purports to disclose that the structure of the plate is such that cavities are created by means of, on the one side, projections extending substantially in one direction and, on the other side, raised areas at the same level between which chambers are embodied for receiving a hardening contact medium, such as mortar or adhesive, which forms a contact layer with the surface lining to be applied. Schlüter also purports to disclose that the structure consists of projections (N1, N2) or (51, S2) which extend in at least two directions and intersect, and that the resulting chambers (M1) are delimited in their circumference by the projections (S1, S2), which are open towards the other side of the plate.

U.S. Pat. No. 9,328,520 (Kriser) purports to disclose a flexible membrane defining pathways for receiving a flexible conduit, and further defining attachment regions between the pathways formed with overhanging walls. Kriser purports to disclose that the membrane may be vacuum-formed plastic sheet material and that the flexible conduits may conduct electricity or heat transfer fluids. Kriser also purports to disclose that the overhanging walls in the attachment regions may provide improved vertical attachment strength to a rigid planar substrate placed over a mortar filled into the attachment regions.

United States Patent App. Pub. No. 2022/0146118 (Schluter) purports to disclose an uncoupling mat that include a flexible layer made of a film-like plastic with structuring that define indentations provided with undercuts on a first, top side and a series of annular cavities formed on an opposite second, bottom side. Schluter purports to disclose that the annular cavities on the bottom side each define a recess on the first side, the indentations have a cross-section adapted to receive a heating cable therein such that the cable can be held in position by the indentations, and a plurality of weakening zones each extends between two rows of annular cavities in a straight line to allow the plastic layer to move substantially transversely to the direction of extension of the weakening zones.

SUMMARY

The following summary is intended to introduce the reader to various aspects of the applicant's teaching, but not to define any invention.

According to some aspects, a flooring underlayment comprises a membrane. The membrane includes a body panel having a panel top surface and a panel underside surface spaced apart from the panel top surface by a panel thickness, the panel top surface and panel bottom surface oriented generally horizontally when in use. The membrane further includes a plurality of discrete dimples projecting downward from the panel underside surface, each dimple having a dimple upper end open to the panel top surface, a closed dimple lower end spaced apart from the dimple upper end by a dimple height, and a dimple sidewall extending between the dimple upper end and the dimple lower end, the dimple sidewall configured to inhibit collapse of the dimple height when a load is applied to the flooring underlayment during use. In addition, the membrane includes a plurality of grooves open to the panel top surface and formed within a groove body projecting downward from the panel underside surface, each groove shaped to receive an elongated heating element therein.

In some examples of the flooring underlayment, when viewed in vertical cross-section, each dimple sidewall extends generally linearly along at least most of the dimple height and is oriented at a sidewall angle of between about 80 degrees and 100 degrees relative to the panel underside surface laterally outward of the dimple sidewall. In some examples, the sidewall angle is less than 90 degrees to provide a negative draft angle along the sidewall for facilitating interlocking engagement between the membrane and cured mortar received therein.

In some examples, when viewed in horizontal cross-section, each dimple sidewall is shaped as a circular annulus. In some examples, each dimple sidewall has a dimple sidewall thickness that is generally equal to the panel thickness.

In some examples, each groove body includes a groove end wall spaced from the panel underside surface by a groove height, and groove sidewalls extending from the panel underside surface to the groove end wall. In some examples, the groove end wall and groove sidewalls each have a groove wall thickness that is generally equal to the panel thickness. In some examples, the groove sidewalls and end wall of each groove are generally of concave arcuate shape when viewed in cross-section.

In some examples, the groove height is less than the dimple height, wherein a ventilation gap is provided below the groove bodies and an underlying surface to facilitate ventilation below the panel underside surface and around adjacent ones of the plurality of dimples. In some examples, the groove height is in a range from about 30 percent of the dimple height to about 90 percent of the dimple height. In some examples, the dimple height is in a range from about 3 mm to about 10 mm, and the groove height is in a range from about 1 mm to about 9 mm. In some examples, the dimple height is in a range from about 4 mm to about 8 mm, and the groove height is in a range from about 2 mm to about 6 mm In some examples, the dimple lower end is closed by a dimple end wall, and the flooring underlayment further includes a fabric sheet releasably adhered to the end walls of the dimples, and the underlayment comprising a continuous ventilation chamber extending laterally around exteriors of adjacent dimples and vertically between the body panel and the fabric sheet.

According to some aspects, a flooring underlayment includes a thermoformed membrane and a fabric sheet releasably adhered to the membrane. The membrane includes a panel having a panel top surface for supporting a finished flooring material and a panel underside surface opposite the panel top surface. The membrane further includes a plurality of dimples projecting from the panel underside surface, each dimple having a closed dimple lower end spaced apart from the panel underside surface by a dimple height. The membrane also includes a plurality of grooves open to the top surface for receiving at least a portion of an elongated heating element therein, each groove formed within a groove body projecting from the panel underside surface, the groove body having a closed groove lower end spaced apart from the panel underside surface by a groove height that is between 30 percent and 90 percent of the dimple height. The fabric sheet has an upper surface releasably adhered to the dimple lower ends of the plurality of dimples by respective frangible bonds. The fabric sheet has a lower surface for anchoring in a layer of adhesive mortar applied to a subfloor surface. The frangible bonds facilitate decoupling of the membrane from the fabric sheet after installation to isolate the finished flooring material from reaction forces exerted between the subfloor and the membrane.

In some examples, the dimples are arranged in a matrix of rows and columns, and the groove bodies extend in straight lines spaced apart from the dimples. In some examples, a ventilation gap is provided between a lowermost surface of each groove body and the upper surface of the fabric sheet, the ventilation gap beneath each of the plurality of groove bodies providing fluid communication between space around adjacent dimples on either side of each groove body for facilitating evacuation of moisture from beneath the membrane. In some examples, the flooring underlayment further includes a heating element in the form of an electrical heating cable inserted in portions of at least some of the plurality of grooves.

According to some aspects, a method of installing flooring includes (a) applying a first adhesive mortar layer to a subfloor surface, and (b) laying a flooring underlayment on the first adhesive mortar layer, the flooring underlayment including a fabric sheet releasably secured to closed ends of dimples projecting downward from a panel underside surface of a membrane body panel, the laying step including anchoring a lower surface of the fabric sheet in the adhesive mortar first layer, the dimples having dimple sidewalls defining a dimple height and holding the membrane body panel above the fabric sheet. The method also includes (c) installing an electrical heating cable in a groove of the membrane, the groove open to an upper surface of the membrane body panel and formed within a groove body projecting from the panel underside surface, the groove body having a closed groove lower end spaced apart from the panel underside surface by a groove height that is between 30 percent and 90 percent of the dimple height wherein a ventilation gap is provided beneath a lowermost surface of the groove body and an upper surface of the fabric sheet.

In some examples, the method includes, after step c), applying an adhesive mortar second layer onto the upper surface of the membrane body panel, the adhesive mortar second layer filling interior spaces of the dimples and grooves, and encasing and covering the electrical heating cable. In some examples, the method includes installing a finished flooring material over the adhesive mortar second layer. In some examples, the method includes activating the electrical heating cable and ventilating the space beneath the membrane body panel via the ventilation gap to facilitate removal of moisture from beneath the membrane.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 1:
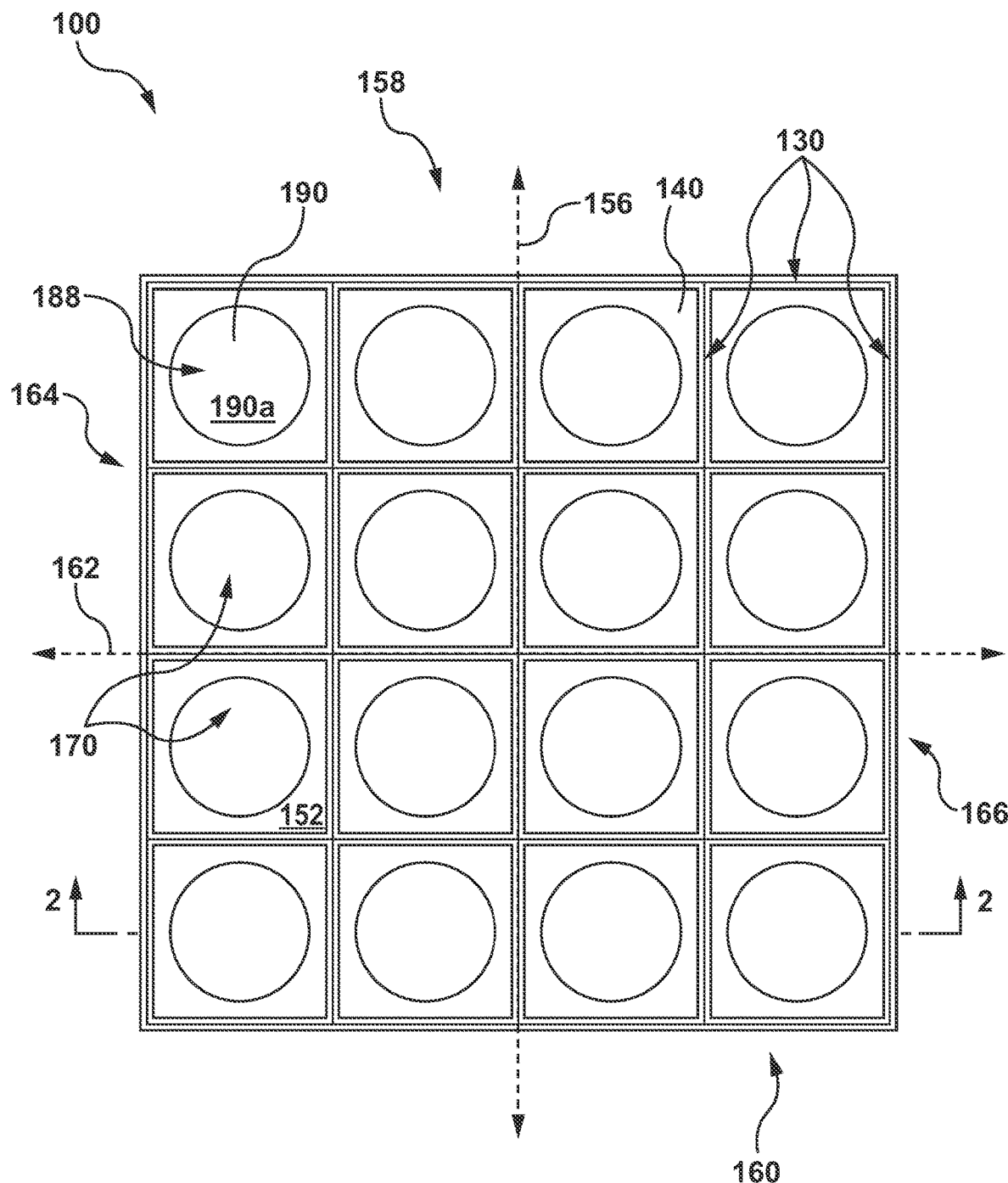
FIG. 1 is a top view of an example of an underlayment in accordance with one or more aspects of the teaching disclosed herein.
Figure 2:
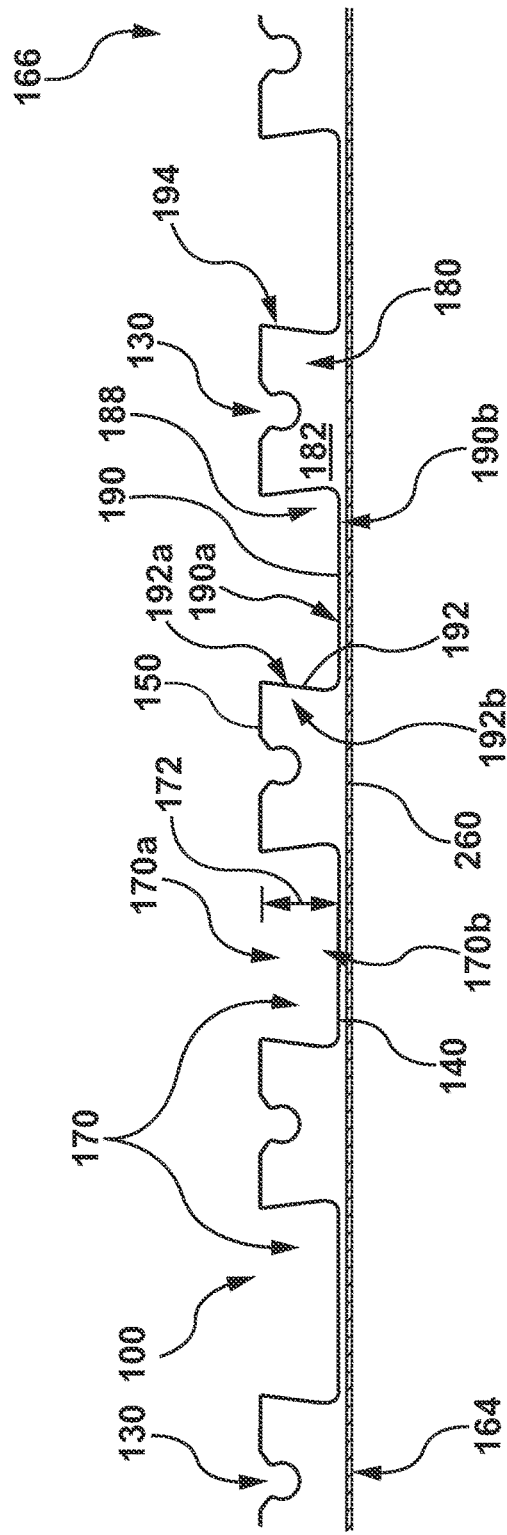
FIG. 2 is a cross-sectional view of the underlayment of FIG. 1 taken along line 2-2.

Referring to FIGS. 1 and 2, an example underlayment 100 is shown. The underlayment 100 can be used as a flooring underlayment installed between a base surface (e.g. a subfloor) and a finished flooring material (e.g. ceramic tile). When used in a flooring system, the underlayment 100 spaces the finished flooring material above the base surface, and can help provide a thermal break between the base surface and the finished flooring material, and dampen noise and/or vibration. The underlayment 100 further operates to provide ventilation underneath the finished flooring material and above the base surface, which can facilitate evacuation of any water or moisture that might otherwise collect between the base surface and flooring material, and the evacuation of which can help prevent moisture damage and microbial growth (e.g. mold). In addition, in some examples the membrane 100 can decouple the finished flooring material from the base surface, so that reaction forces exerted by the base surface (for example, due to shifting, settling, or thermal expansion and contraction of the base surface) are not transferred or not fully transferred to the finished flooring material. This can help prevent damage to the finished flooring material, including cracking of the finished flooring material or loosening of the finished flooring material from the installed flooring system.

Figure 3:
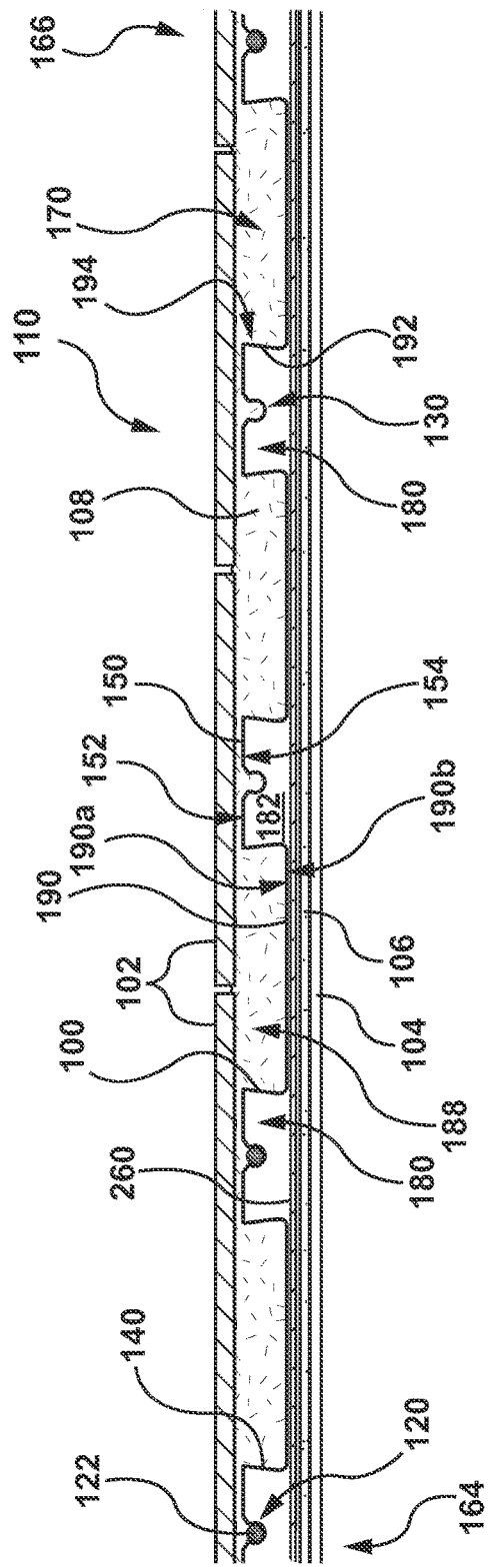
FIG. 3 is a cross-sectional view of the underlayment of FIG. 1 in use in an example flooring system.
Figure 4:
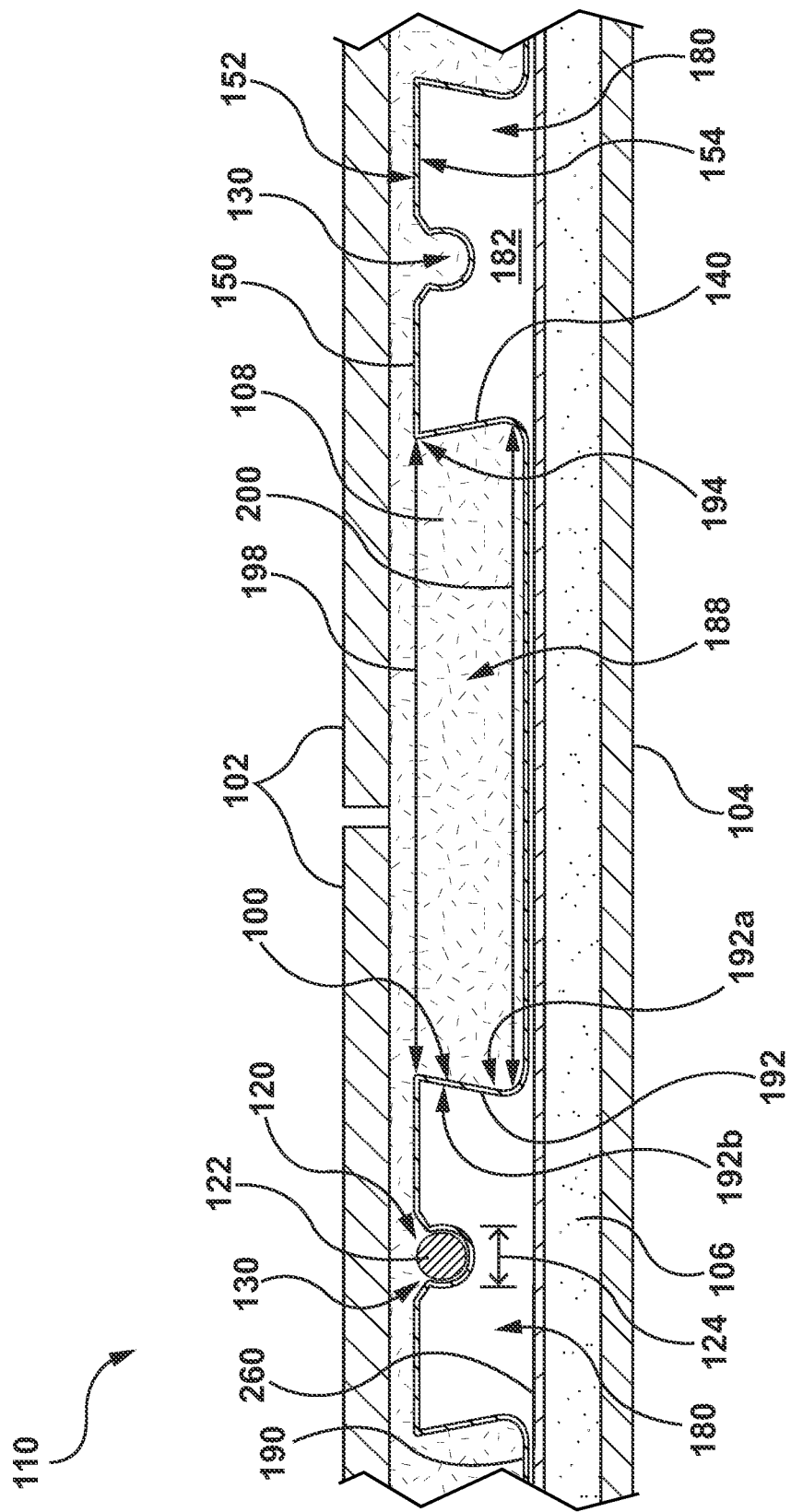
FIG. 4 is an enlarged view of a portion of the structure of FIG. 3.

Referring now to FIGS. 3 and 4, the underlayment 100 is installed between flooring material 102 and a base layer 104. In some examples, the base layer 104 is a sub-floor such as a layer of wood or concrete. In some examples, the flooring material 102 is a finished flooring material such as carpet, hardwood, laminate, or vinyl, or tile. In the example illustrated, the flooring material 102 is a finished flooring material in the form of ceramic tile.

Referring again to FIGS. 3 and 4, in the example illustrated, the underlayment 100 is used with an adhesive mortar first layer 106 and an adhesive mortar second layer 108. The adhesive mortar may be, for example, a thin-set mortar or epoxy mortar. The adhesive mortar first layer 106 is provided between the underlayment 100 and the base layer 104.

The adhesive mortar first layer 106 provides support for the underlayment 100 and flooring material 102, and may adhere the underlayment 100 to the base layer 104, at least during installation of the flooring system.

The adhesive mortar second layer 108 is provided between the underlayment 100 and the flooring material 102. The adhesive mortar second layer 108 provides further support for the flooring material 102, and in the example illustrated, adheres the flooring material 102 in fixed position to the underlayment 100.

In the example illustrated, the underlayment 100 includes a dimpled membrane 140 and a fabric sheet 260 that is releasably bonded to a bottom exterior surface of the dimpled membrane with a frangible bond. In some examples, the flooring system 110 may include one or more additional layers between the flooring material 102 and the base layer 104.

In the example illustrated, the underlayment 100 is configured to be used with an optional heating element 120 to warm the finished flooring. The heating element 120 can include any heat transferring element, such as, for example, an electrical heating cable or a fluid conduit for conveying a heated fluid. In the example illustrated, the underlayment 100 is configured for use with a heating element in the form of a heating cable 122. Using a heating cable 122 as the heating element can offer advantages over other heating elements, for example, ease of installation and minimum space requirements. In the example illustrated, the heating cable 122 is sized to have a relatively small diameter 124 which can help provide a modest overall height of flooring system 110.

Referring again to FIGS. 1 and 2, the membrane 140 of the underlayment 100 is generally formed of a moisture impermeable polymeric material. In some examples, the membrane 140 is formed of a thermoplastic elastomer. In some examples, the membrane 140 is made from a plastic or composite such as polyethylene, high-density polyethylene, and/or polypropylene. In the example illustrated, the membrane 140 is of integral, unitary, one-piece construction.

Figure 5:
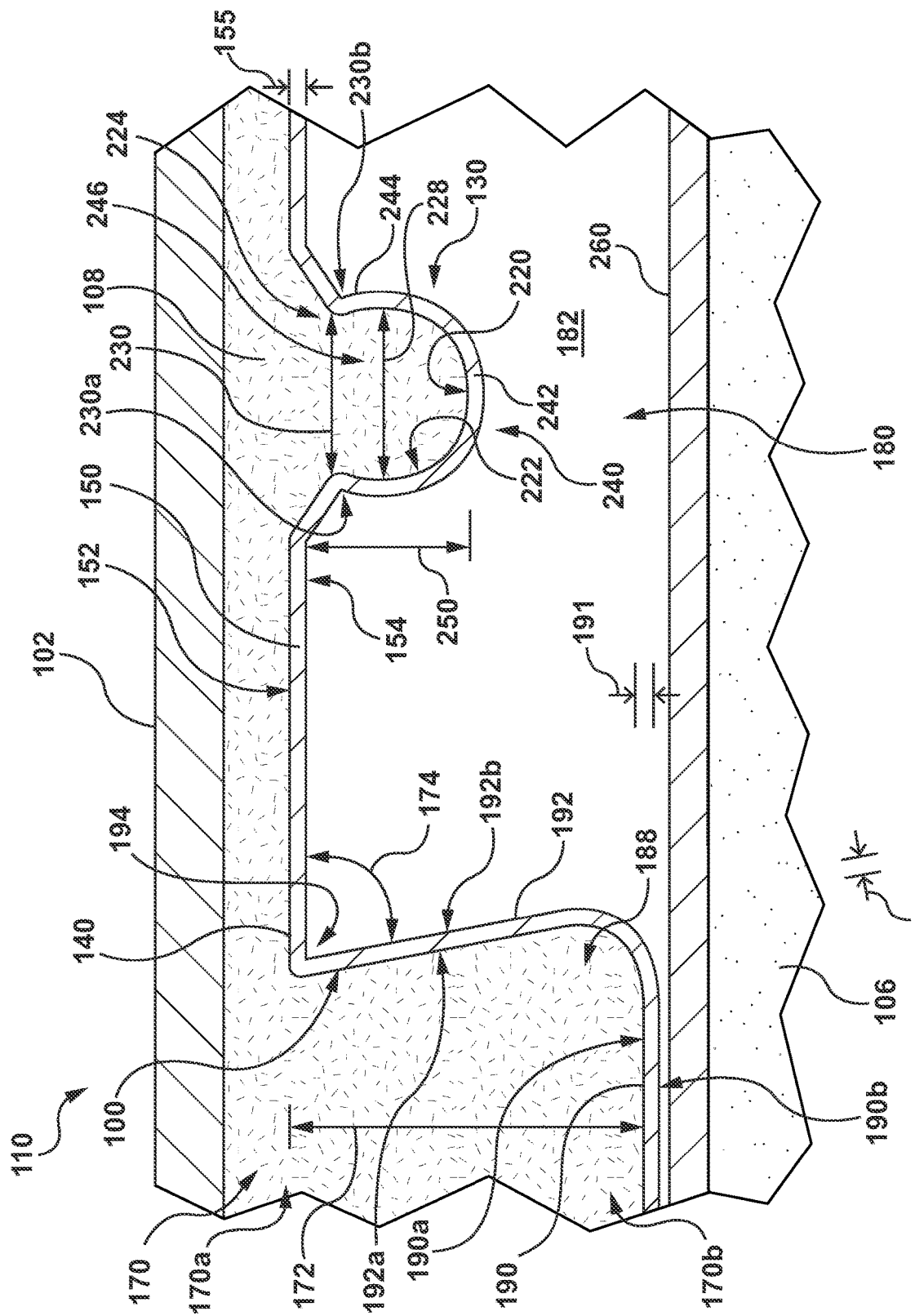
FIG. 5 is a further enlarged view of a portion of the structure of FIG. 4.
Figure 6:
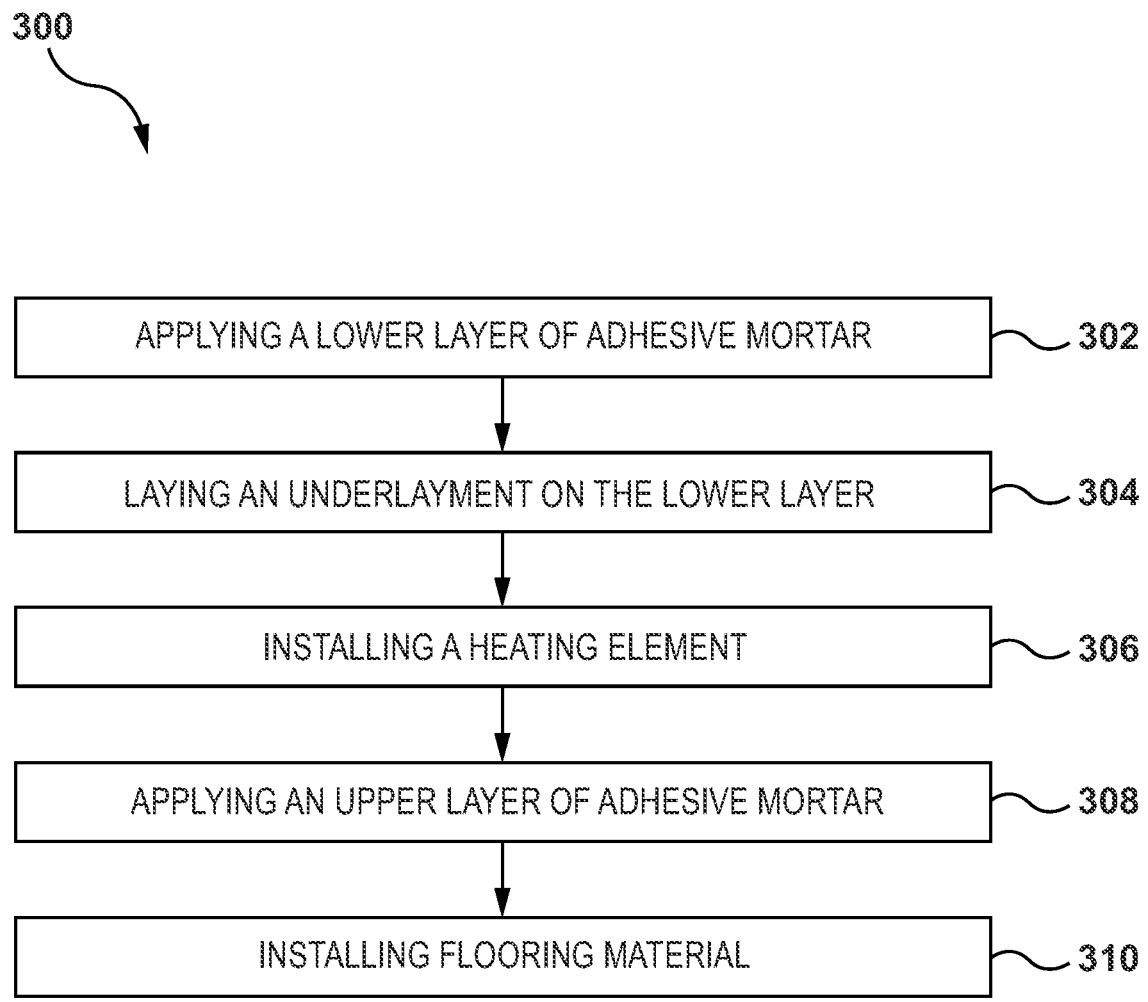
FIG. 6 is a flow diagram of a method of installing flooring.

The membrane 140 includes a body panel 150 that has a generally planar panel top surface 152 and a generally planar panel underside surface 154 spaced apart from the panel top surface 154 by a panel thickness 155 (FIG. 5). When in use, the panel top surface 152 is directed upward toward the flooring material 102, and the panel underside surface 154 is directed downward toward the base layer 104 (FIG. 3).

Referring still to FIGS. 1 and 2, the body panel 150 has a longitudinal axis 156 extending between a panel front end 158 and a panel rear end 160 opposite the front end 158. The body panel 150 also has a transverse axis 162 perpendicular to the longitudinal axis 156 and extending between a panel first lateral end 164 and a panel second lateral end 166 opposite the first lateral end 164.

The membrane 140 further includes a plurality of discrete dimples 170 projecting from the underside surface 154 of the panel 150. The dimples 170 are configured to support the body panel 150 above an underlying surface. For example, when the underlayment 100 is positioned for use on the adhesive mortar first layer 106, the dimples 170 hold the body panel 150 of the membrane 140 above the mortar first layer 106.

With reference again to FIGS. 1 and 2, the dimples 170 are discrete elements spaced apart from one another and, in the example illustrated, arranged in a matrix of rows (parallel to axis 162) and columns (parallel to axis 156). Each dimple 170 has a dimple upper end 170a that is open to, and coplanar with, the top surface 152 of the body panel, and a dimple lower end 170b spaced vertically below the upper end 170a by a dimple height 172 In the example illustrated, the dimple lower end 170b of each dimple 170 is closed by a dimple end wall 190 having an end wall inner surface 190a directed toward a dimple interior 188 of the dimple 170, and an end wall outer surface 190b opposite the end wall inner surface 190a. In the example illustrated, each dimple end wall 190 has an end wall thickness 191 (FIG. 5) that extends between the end wall inner surface 190a and the end wall outer surface 190b. The end wall thickness 191 of the dimple end wall 190 of each dimple 170 is, in the example illustrated, generally equal to the panel thickness 155.

Each dimple 170, in the example illustrated, has an upper peripheral edge 194 generally circumscribing the upper open end 170a of the dimple 170. The upper edge 194 is proximate the body panel 150. In the example illustrated, the body panel 150 generally extends horizontally between the upper edges 194 of the dimples 170 when the membrane 140 is installed.

Each dimple further includes, in the example illustrated, a dimple sidewall 192 that extends between a periphery of the dimple upper end 170a and a periphery of the dimple lower end 170b. The dimple sidewall 192 is configured to inhibit collapse of the dimple height 172 (e.g. vertical collapse of the dimple) when a load is applied to the underlayment during use. Configuring the dimple sidewalls to be generally straight (linear) along their vertical extent, and oriented parallel to, or near-parallel to, the vertical when in use can facilitate inhibiting collapse of the dimple height 172. More particularly, good resistance to collapse has been achieved with dimple sidewalls 192 oriented within about 10 degrees of vertical.

In the example illustrated, each dimple sidewall 192 has a sidewall thickness 196 (FIG. 5) that extends between a sidewall inner surface 192a directed toward the dimple interior 188 and a sidewall outer surface 192b opposite the sidewall inner surface 192a. The sidewall thickness 196 of the dimple sidewall 192 of each dimple 170 is, in the example illustrated, generally equal to the panel thickness 155.

In the example illustrated, when viewed in vertical cross-section, each dimple sidewall 192 extends generally linearly along at least most of the dimple height 172 (and almost the entire dimple height 172 in the example illustrated) and is oriented at a sidewall angle 174 (FIG. 5) of between about 80 degrees and 100 degrees relative to the panel underside surface 154 laterally outward of the dimple sidewall. The panel 150 and its underside surface 154 are, in the example illustrated, configured to lie in a generally horizontal plane when installed for use, so that a sidewall angle 174 within about 10 degrees of perpendicular to the panel underside surface results in a sidewall that is oriented within about 10 degrees of vertical.

Furthermore, in the example illustrated, the sidewall angle 174 is optionally less than 90 degrees to provide a negative draft angle along the sidewall 192 for facilitating interlocking engagement between the membrane and cured mortar received therein. More particularly, in the example illustrated, the dimple sidewall angle 172 is about 85 degrees, providing a reverse taper such that a dimple lower width 200 (FIG. 4) extending between opposed sidewall surfaces proximate the dimple lower end 170b is greater than a dimple upper width 198 (FIG. 4) of the dimple 170 proximate the dimple upper end 170a (FIG. 4). This can provide an undercut in which adhesive mortar inside the dimple interior 188 is overlapped above by a portion of the membrane 140. Such an undercut can help to lock the adhesive mortar second layer 108 (once cured) and the membrane 140 together, and in particular, can inhibit vertical movement of the membrane 140 relative to the adhesive mortar second layer 108.

The dimples 170 are, in the example illustrated, generally circular when viewed along a vertical axis (or e.g., generally circular in cross-section taken in a plane parallel to the panel top surface 152). A circular cross-section can help avoid trapping air inside the dimple when the dimple fills with adhesive mortar during application of the adhesive mortar second layer 108. Mare particularly, in the example illustrated, each dimple 170 sidewall 192 has the shape of a circular annulus extending radially between the sidewall inner surface 192a and the sidewall outer surface 192b. The sidewall 192 extends continuously about (or encircles) the dimple interior 188.

In the example illustrated, the membrane 102 including the body panel 150 and dimples 170 is of one-piece, unitary, integral construction. An open ventilation space 180 is formed below the panel underside surface 154 and around the sidewall outer surfaces 192b of the dimple sidewalls 192 of each dimple 170.

Referring again to FIGS. 3 to 5, when the membrane 140 rests on an underlying surface with the dimples 170 in contact with the underlying surface, a continuous chamber 182 is formed between the underside surface 156 of the panel 150 and the underlying surface. The chamber 182 is generally defined by all of the open spaces 180 around the exterior of each dimple being in fluid communication with one another. The chamber 182 facilitates moisture movement below the underside surface 154 of the panel 150.

As mentioned previously, the membrane 140 further includes grooves 130 configured to receive a heating element therein. In the example illustrated, each groove 130 is open to the top surface 152 of the body panel 150. In the example illustrated, each groove 130 presents an elongate concave arcuate depression sized to receive a heating cable 122 of the heating element 120.

In the example illustrated, the grooves 130 extend linearly along the length and width of the membrane between adjacent dimples 170, forming a gridwork of grooves 130 and delineating the dimples 170 into respective rows and columns. The plurality of grooves 130 intersect one another and open laterally into one another at the points of intersection. An elongated heating element 120 may be installed along portions of multiple ones of the grooves 130 by bending the heating element 120 at one or more points of intersection of the grooves 130 to change between row-oriented grooves and a column-oriented grooves.

In the example illustrated, each groove 130 is formed within a groove body 240 that projects downwardly from the underside surface 154 of the body panel 150 (FIG. 5). The groove body 240 is integrally formed with the membrane 140 and includes one or more groove walls each having a groove wall thickness that is equal to the panel thickness and the dimple sidewall thickness. In the example illustrated, the cross-sectional thickness of the membrane material is generally uniform throughout the membrane. In the example illustrated, the groove body 240 (and groove walls thereof) includes a groove end wall 242 spaced from the underside surface 154 by a groove height 250, and groove side walls 244 extending from the panel underside surface 154 to the groove end wall 242. In the example illustrated, the groove end wall 242 and groove side walls 244 form a generally continuous arcuate portion of a circle when viewed in cross-section.

In the example illustrated, inner surfaces of the groove end wall 242 and groove side walls 244 partially bound a groove interior 246 of the groove 130. In the example illustrated, an inner surface of the groove end wall 242 defines a groove floor portion 220 of the groove 130, and inner surface of the opposed groove side walls 244 define groove side portions 222 of the groove 130.

Each groove 130 further includes a groove mouth 224 that is open to the panel top surface 154. The groove depth 250 is sized to receive at least half of the width (or diameter) 124 (FIG. 4) of the heating element 120 to facilitate preventing undesired movement of the heating element out of the grooves. In some examples, an upper portion of the heating element 120 may protrude upward above the top surface 152 of the body panel 150, projecting through the mouth 224. Any upwardly protruding portion of the heating element would subsequently be covered by, and embedded within, the adhesive mortar second layer 108.

Referring again to FIG. 5, in some examples, the groove 130 is provided with one or more retaining elements proximate the mouth of the groove to help retain the heating element in position in the groove 130. In the example illustrated, the groove 130 is provided with laterally inwardly directed protrusions 230a, 230b at upper edges of the groove side walls 244, formed by converging portions of the groove side walls 244. The opposed protrusions 230a, 230b provide a narrowed width 230 of the mouth 224 of the groove 130 (proximate the groove upper end 226) that is narrower than a largest width 228 of the groove 130 at a position below the mouth 224. The largest groove width 228 is sized to snugly receive the diameter 124 of the heating cable 122. In use, an installer can push the heating element 120 through the mouth 224 of the groove 130, temporarily urging the protrusions 230a, 230b apart for snap-fit assembly of the heating element into the groove 130. Once installed the protrusions 230a, 230b return at least partially toward their relaxed position (defining the narrowed width 230) under the biasing force of the resiliently flexible groove sidewalls 244.

In the example illustrated, the grove height 250 of the grooves 130 is less than the dimple height 172, providing a ventilation gap below the groove bodies 240 and above an upward facing surface of material underlying the membrane to facilitate ventilation of the space underneath the body panel 150 and around the exterior surface of adjacent dimples 170.

In some examples, a preferred groove height is in a range from about 30 percent of the dimple height to about 90 percent of the dimple height. In some examples, a preferred dimple height is in a range from about 3 mm to about 10 mm, and a preferred groove height is in a range from about 1 mm to about 9 mm. In the example illustrated, the dimple height 172 is about 8 mm and the groove height 250 is about 5 mm, providing a ventilation gap height of about 3 mm. The heating cable 122, in the example illustrated, has a dimeter 124 of about 6 mm.

In use, the heating element 120 can be installed in one or more grooves prior to application of the adhesive mortar second layer 108. When applying the second mortar layer 108, the mortar can fill the dimple interiors 188, fill the empty grooves 130, and fill any space in the groove interiors 246 around the heating elements for those grooves in which a heating element has been installed. In some examples, allowing the mortar of the mortar second layer 108 to enter grooves 130 with heating elements therein can improve thermal transfer from the heating element 120 to the flooring material 102.

In some examples, the underlayment 100 includes a fabric layer 260. The example fabric layer 260 is a generally planar sheet of nonwoven material. In some examples, the fabric layer can be of another material, including, for example, fleece, felt, or synthetic material. The fabric layer 260 can be attached to a bottom surface of the membrane 140. In the example illustrated, the fabric layer 260 is releasably adhered by a frangible bond to an outer surface of the end walls 190 of some or all of the dimples 170. The frangible bond may be provided by an adhesive that bonds weakly to one or both of the fabric layer and the membrane surface.

When the underlayment 100 is positioned on the adhesive mortar first layer 106 for installation, the fabric layer 260 contacts, and is pressed against, an exposed upper surface of the mortar first layer 106 prior to curing thereof. The fabric layer 260 of the underlayment 100 is thereby securely adhered to the mortar first layer 106. Accordingly, the fabric layer 260 is fixed to move and shift with the subfloor 104 and mortar first layer 106 applied thereto. After application of adhesive mortar second layer 108, the membrane 140 of the underlayment 100 is fixed to move with the mortar second layer 108 and flooring material applied thereto. A first instance of a relative force exerted by one on the other of the upper and lower fixed subassemblies will release the frangible bond between the fabric layer 260 and the membrane 140 of the underlayment 100, such that no reaction force (e.g. lateral shifting force) can be transferred through the underlayment 100 from the subfloor to the finished flooring material. The membrane (and materials fixed above the membrane) are able to "float" relative to fabric layer 260 (and materials to which it is affixed thereunder), thereby accommodating transverse shifting of one relative to the other without damage to the flooring material 102.

Referring now to FIG. 5, illustrated is an example method 300 of installing flooring.

In some examples, the method 300 includes, at step 302 applying the adhesive mortar first layer 106 to the base layer 104. Applying the mortar first layer 106 may include depositing adhesive mortar on the base layer 104. Step 302 may include spreading the adhesive mortar over the base layer 104. In some examples, the adhesive mortar is thin-set mortar.

At step 304, the underlayment 100 is laid on the mortar first layer 106. The underlayment 100 includes the fabric layer 260, and the fabric layer 260 is pressed into contact with the lower layer 106. The membrane 140 is above the fabric sheet 260 and the body panel 150 is held separate from the fabric sheet 260 by the dimples 170.

At step 306, the heating element 120 is installed in the groove 130 of the underlayment 100. In some examples, the heating element 120 has a larger cross-sectional dimension than the mouth 224 of the groove 130, the width 230 of the mouth 224 being narrower than a deeper portion of the groove 130. Step 306 may include snapping the heating element 120 into the groove 130. The heating element 120 is an elongated element and is passed through a mouth of the groove to extend along the groove 130. The heating element 120 may project though the mouth when installed. For example, a portion of a lateral wall of the heating element 120 may extend out through the mouth 224. In some examples, the heating element 120 is a heating cable.

In some examples, method 300 includes step 308. At step 308, an adhesive mortar second layer is laid over the flooring underlayment 100 and installed heating element 120. Applying the mortar second layer 108 may include depositing adhesive mortar on the membrane 140. Step 308 may include spreading the adhesive mortar over the membrane 140. Step 308 includes depositing the adhesive mortar inside the interior of the dimples 170. Step 308 follows step 306.

In some examples, method 300 includes step 310. At step 310, flooring material 102 is installed over the upper layer 108. In some examples, the flooring material 102 is tile. In some examples, tiles 312 (FIG. 3) are laid on the adhesive mortar. It will be appreciated that in some examples the method 300 may include installing one or more additional layer between or over the layers recited above.

The invention claimed is:

1. A flooring underlayment comprising a membrane, the membrane including:
   a) a body panel having a panel top surface and a panel underside surface spaced apart from the panel top surface by a panel thickness, the panel top surface and panel underside surface oriented generally horizontally when in use;
   b) a plurality of discrete dimples projecting downward from the panel underside surface, each dimple having a dimple upper end open to the panel top surface, a closed dimple lower end spaced apart from the panel underside surface, and a dimple sidewall extending between the dimple upper end and the dimple lower end, each dimple having a dimple height extending vertically from the panel underside surface to the dimple lower end, the dimple sidewall configured to inhibit collapse of the dimple height when a load is applied to the flooring underlayment during use; and
   c) a plurality of grooves open to the panel top surface and formed within a groove body projecting downward from the panel underside surface, each groove shaped to receive an elongated heating element therein;
   wherein each groove body includes a groove lower end disposed at an elevation below the panel underside surface, each groove body having a groove height extending vertically from the panel underside surface to the groove lower end, wherein the groove height is in a range from about 30 percent of the dimple height to about 90 percent of the dimple height, and wherein a ventilation gap is provided below the groove bodies and above an underlying surface to facilitate ventilation below the panel underside surface and around adjacent ones of the plurality of dimples.

2. The flooring underlayment of claim 1, wherein when viewed in vertical cross-section, each dimple sidewall extends generally linearly along at least most of the dimple height and is oriented at a sidewall angle of between about 80 degrees and 100 degrees relative to the panel underside surface.

3. The flooring underlayment of claim 2, wherein the sidewall angle is less than 90 degrees to provide a negative draft angle along the sidewall for facilitating interlocking engagement between the membrane and cured mortar received therein.

4. The flooring underlayment of claim 3, wherein when viewed in horizontal cross-section, each dimple sidewall is shaped as a circular annulus.

5. The flooring underlayment of claim 2, wherein each dimple sidewall has a dimple sidewall thickness that is generally equal to the panel thickness.

6. The flooring underlayment of claim 1, wherein the groove lower end of each groove body includes a groove end wall and each groove body further comprises groove sidewalls extending from the panel underside surface to the groove end wall.

7. The flooring underlayment of claim 6, wherein the groove end wall and groove sidewalls each have a groove wall thickness that is generally equal to the panel thickness.

8. The flooring underlayment of claim 6, wherein the groove sidewalls and end wall of each groove are generally of concave arcuate shape when viewed in cross-section.

9. The flooring underlayment of claim 1 wherein the dimple height is in a range from about 5 mm to about 10 mm.

10. The flooring underlayment of claim 1, wherein the dimple lower end is closed by a dimple end wall, the flooring underlayment further comprising a fabric sheet releasably adhered to the end walls of at least some of the dimples, and the underlayment comprising a continuous ventilation chamber extending laterally around exteriors of adjacent dimples and vertically between the body panel and the fabric sheet.

11. A flooring underlayment comprising:
   a) thermoformed membrane, the membrane including:
      i) a panel having a panel top surface for supporting a finished flooring material and a panel underside surface opposite the panel top surface;
      ii) a plurality of dimples projecting from the panel underside surface, each dimple having a closed dimple lower end spaced apart from the panel underside surface by a dimple height;
      iii) a plurality of grooves open to the top surface for receiving at least a portion of an elongated heating element therein, each groove formed within a groove body projecting from the panel underside surface, the groove body having a closed groove lower end spaced apart from the panel underside surface by a groove height that is between 30 percent and 90 percent of the dimple height; and
   b) a fabric sheet having an upper surface releasably adhered to the dimple lower ends of the plurality of dimples by respective frangible bonds, and a lower surface for anchoring in a layer of adhesive mortar applied to a subfloor surface, the frangible bonds facilitating decoupling of the membrane from the fabric sheet after installation to isolate the finished flooring material from shifting forces exerted between the subfloor and the membrane;
   wherein the dimples are arranged in a matrix of rows and columns, and the groove bodies extend in a straight lines spaced apart from the dimples, and wherein a ventilation gap is provided between a lowermost surface of each groove body and the upper surface of the fabric sheet, the ventilation gap beneath each of the plurality of groove bodies providing fluid communication between space around adjacent dimples on either side of each groove body for facilitating evacuation of moisture from beneath the membrane.

12. The flooring underlayment of claim 11, further comprising said heating element in the form of an electrical heating cable inserted in portions of at least some of the plurality of grooves.

13. A method of installing flooring, comprising:
   a) applying an adhesive mortar first layer to a subfloor surface;
   b) laying a flooring underlayment on the adhesive mortar first layer, the flooring underlayment including a fabric sheet releasably secured to closed ends of dimples projecting downward from a panel underside surface of a membrane body panel, the laying step including anchoring a lower surface of the fabric sheet in the adhesive mortar first layer, the dimples having dimple sidewalls defining a dimple height extending vertically from the panel underside surface to a dimple lower end of each dimple, and the dimples holding the membrane body panel above the fabric sheet; and
   c) installing an electrical heating cable in a groove of the membrane, the groove open to an upper surface of the membrane body panel and formed within a groove body projecting from the panel underside surface, the groove body having a closed groove lower end spaced apart from the panel underside surface and the groove body having a groove height extending from the panel underside surface to the closed groove lower end, wherein the groove height is between 30 percent and 90 percent of the dimple height, and wherein a ventilation gap is provided beneath a lowermost surface of the groove body and an upper surface of the fabric sheet.

14. The method of claim 13, further comprising, after step c), applying an adhesive mortar second layer onto the upper surface of the membrane body panel, the adhesive mortar second layer filling interior spaces of the dimples and grooves, and encasing and covering the electrical heating cable.

15. The method of claim 14, further comprising installing a finished flooring material over the adhesive mortar second layer.

16. The method of claim 15, further comprising activating the electrical heating cable and ventilating the space beneath the membrane body panel via the ventilation gap to facilitate removal of moisture from beneath the membrane.

* * * * *